United States Patent
Jung (10) Patent No.: US 9,817,989 B2
(45) Date of Patent: Nov. 14, 2017

(54) ACCESS CONTROL OF EXTERNAL MEMORY

(71) Applicant: Empire Technology Development LLC, Wilmington, DE (US)

(72) Inventor: Yang-Won Jung, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 195 days.

(21) Appl. No.: 14/343,968

(22) PCT Filed: Jul. 8, 2013

(86) PCT No.: PCT/US2013/049526
§ 371 (c)(1),
(2) Date: Mar. 10, 2014

(87) PCT Pub. No.: WO2015/005894
PCT Pub. Date: Jan. 15, 2015

(65) Prior Publication Data
US 2016/0026814 A1    Jan. 28, 2016

(51) Int. Cl.
*G06F 21/62*     (2013.01)
*G06F 3/06*      (2006.01)
*G06F 21/36*     (2013.01)
*G06F 21/31*     (2013.01)

(52) U.S. Cl.
CPC ........ *G06F 21/6218* (2013.01); *G06F 3/0622* (2013.01); *G06F 3/0637* (2013.01); *G06F 3/0679* (2013.01); *G06F 21/31* (2013.01); *G06F 21/36* (2013.01); *G06F 21/6209* (2013.01)

(58) Field of Classification Search
CPC ...... G06F 21/6218; G06F 21/62; G06F 21/31; G06F 21/36; G06F 3/062
See application file for complete search history.

(56) References Cited

U.S. PATENT DOCUMENTS

| | | | |
|---|---|---|---|
| 7,284,132 B2 | 10/2007 | Nakabe et al. | |
| 7,406,604 B2 | 7/2008 | Berry et al. | |
| 2001/0039620 A1* | 11/2001 | Berry | G06F 21/62 713/193 |
| 2007/0266259 A1* | 11/2007 | Utsumi | G06F 21/80 713/183 |

(Continued)

OTHER PUBLICATIONS

Kevin Otnes, Windows 7 Made Simple, 2011, Apress, http://link.springer.com/book/10.1007%2F978-1-4302-3651-1.*

(Continued)

*Primary Examiner* — Khang Do
(74) *Attorney, Agent, or Firm* — Brundidge & Stanger, P.C.

(57) ABSTRACT

Technologies are generally described for an access control scheme for an external device. In some examples, an electronic device may detect the external memory connected to the electronic device; set a security code to enable access to the external memory; receive a request to access the external memory; access the external memory in response to entry of the security code; receive a request to disconnect the external memory; and remove a requirement for entry of the security code to enable access to the external memory.

20 Claims, 9 Drawing Sheets

(56) References Cited

U.S. PATENT DOCUMENTS

| | | | |
|---|---|---|---|
| 2008/0107262 A1* | 5/2008 | Helfman | G06F 21/62 380/44 |
| 2008/0195830 A1* | 8/2008 | Lee | G06F 21/79 711/164 |
| 2008/0238670 A1* | 10/2008 | Carney | B42D 25/00 340/546 |
| 2009/0125725 A1* | 5/2009 | Kim | G06F 21/79 713/184 |
| 2009/0182937 A1 | 7/2009 | Ebrara | |
| 2010/0205373 A1* | 8/2010 | He | G06K 19/07 711/115 |
| 2010/0251358 A1* | 9/2010 | Kobayashi | G06F 21/79 726/18 |
| 2011/0138378 A1 | 6/2011 | Chang et al. | |
| 2011/0213941 A1* | 9/2011 | Chou | G06F 21/10 711/164 |
| 2012/0282884 A1* | 11/2012 | Sun | H04M 11/04 455/404.2 |
| 2013/0007472 A1* | 1/2013 | Yamada | G06F 21/79 713/193 |
| 2013/0113736 A1 | 5/2013 | Kornilovsky et al. | |
| 2013/0174252 A1* | 7/2013 | Weber | G06F 21/6218 726/20 |
| 2014/0281562 A1* | 9/2014 | Kespohl | G06F 21/31 713/184 |

OTHER PUBLICATIONS

Kakasoft, How to Password Protect SD Card on Windows, Dec. 2012, http://www.kakasoft.com/usbsecurity/howtoencryptsdcard.html.*

Mooney, R., "How to Unlock the Memory Card in a Nokia Mobile," eHow, accessed at http://web.archive.org/web/20100525140506/ http://www.ehow.com/print/how_6512136_unlock-memory-card-nokia-mobile.html, accessed on Jan. 21, 2014, pp. 1-2.

International Search Report with Written Opinion for International Application No. PCT/US2013/049526 mailed on Dec. 17, 2013.

* cited by examiner

ACCESS CONTROL OF EXTERNAL MEMORY

CROSS-REFERENCE TO RELATED APPLICATION

This Application is the U.S. National Stage filing under 35 U.S.C. §371 of International Application No. PCT/US13/49526, filed on Jul. 8, 2013.

BACKGROUND

Mobile electronic devices, such as smartphones and tablets, have internal memories to store electronic files including program files, data files, audio files, image files or video files, which have been generated by the mobile electronic devices or received from other electronic devices. However, due to typical capacity limitations of internal memories of mobile electronic devices, users of the mobile electronic devices often use external memories to secure more storage for the electronic files.

SUMMARY

In an example, a method performed under control of an electronic device may include detecting an external memory connected to the electronic device; setting a security code to enable access to the external memory; receiving a request to access the external memory; accessing the external memory in response to entry of the security code; receiving a request to disconnect the external memory; and removing a requirement for entry of the security code to enable access to the external memory.

In another example, a method performed under control of an electronic device may include detecting an external memory that is operatively connected to the electronic device; and requiring a security code to enable access to the external memory.

In yet another example, an electronic device may include a processor; an internal memory; an operating system stored in the internal memory; and a connector configured to connect an external memory. In this example, the operating system may causes, in response to execution, the processor to perform operations including detecting the external memory operatively connected to the connector; and setting a security code to enable access to the external memory.

In yet another example, a computer-readable storage medium may store thereon computer-executable instructions that, in response to execution, cause a processor to perform operations, including detecting an external memory that is operatively connected to the electronic device; requiring a security code to enable access to the external memory; receiving a request to disconnect the external memory; and enabling access to the external memory without entry of the security code.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to an electronic device (including a mobile electronic device) to which an external memory may be connected, in which the electronic device may store data files and/or program files. Further, technologies are herein generally described for an access control scheme for the external memory implemented by the electronic device.

In some examples, a user of the electronic device may connect the external memory to the electronic device to increase storage capacity. Upon connection, the electronic device may detect the external memory and scan it to identify the contents stored therein. The electronic device may set a security code to enable access to the external memory. The security code may be the same as that for the electronic device, or the security code may be generated by an operating system of the electronic device. When the user accesses the external memory by, for example, selecting the external memory from a navigation pane displayed on a screen of the electronic device, the operating system may enter the security code to gain access to the external memory on behalf of the user.

When the user of the external memory intends to safely remove the external memory from the electronic device by, for example, performing an external memory removal function, which may be provided by the operating system of the electronic device, the operating system may again remove a requirement for entry of the security code to enable access to the external memory. Having been authorized for safe removal, the external memory may then be disconnected from the electronic device and subsequently connected to at least one other electronic device without requiring the security code to enable access thereto. However, if the external memory is not authorized for safe removal from the electronic device, via, e.g., the external memory removal function, the security code requirement may not be removed from the external memory. Thus, when an attempt is made to access the external memory, which has been removed or disconnected from the electronic device in an unauthorized or unsafe manner, using any other electronic device, the security code may be required. Thus, the contents stored in the external memory may be protected from an unauthorized access.

Figure 1A:
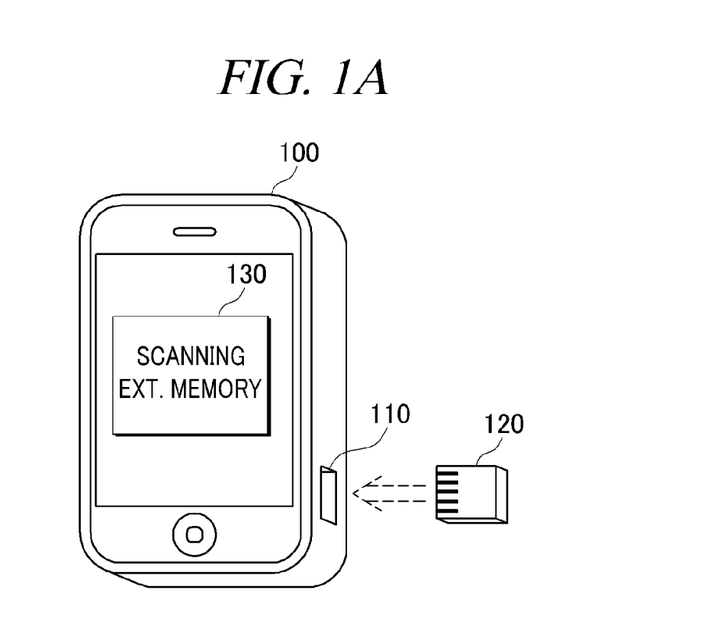
FIGS. 1A and 1B schematically show an illustrative example of an electronic device and an external memory which can be connected to and disconnected from the electronic device, arranged in accordance with at least some embodiments described herein.
Figure 1B:
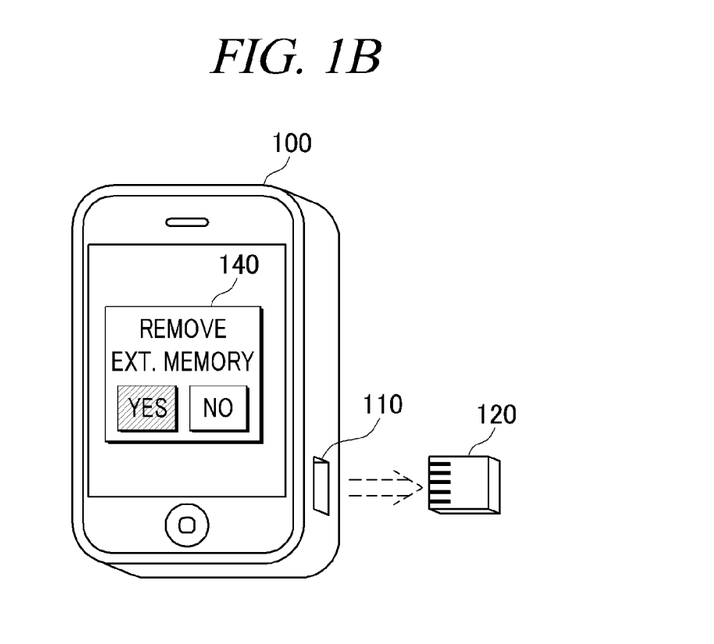

FIGS. 1A and 1B schematically show an illustrative example of an electronic device and an external memory, which can be connected to and disconnected from the electronic device, arranged in accordance with at least some embodiments described herein.

As depicted, an electronic device 100 may have a connector 110 to which an external memory 120 may be operatively connected. Electronic device 100 may be any type of electronic device configured to store, retrieve, compute, transmit and/or receive data, including, for example, a smartphone, a mobile phone, a personal digital assistant (PDA), a tablet, a laptop computer, etc. Connector 110 may be configured or shaped to receive external memory 120 therein. In some embodiments, connector 110 may be exposed on the outside of electronic device 100 to accept a cable connector (not shown) that may be connected to external memory 120. External memory 120 may be any type of memory device configured to be operatively connected to electronic device 100 and to store data therein. Non-limiting examples of external memory 120 may include a memory card, such as an SD (Secure Digital) card, a CF (Compact Flash) card, a micro drive, a memory stick, a smart media card or an extreme digital picture card, a USB memory, an external hard disk drive (HDD), etc. Although the below description describes that electronic device 100 performs several operations and/or functions in accordance with at least some embodiments, those skilled in the art will recognize that computer programs or program modules, which may include an operating system or an application, stored in and executed by electronic device 100 may likewise perform the operations and/or functions described herein.

In some example embodiments, as depicted in FIG. 1A, when external memory 120 is operatively connected to electronic device 100 via connector 110, electronic device 100 may scan external memory 120 to identify external memory 120 and its folders and/or files stored therein. During the scanning, electronic device 100 may display, on its screen, a message 130 (e.g., SCANNING EXT. MEMORY) indicating that external memory 120 is being scanned. In some embodiments, the scanning of external memory 120 may be implemented by an operating system or an application, which may be stored in and/or hosted on electronic device 100.

Further to the example embodiments, after the scanning of external memory 120, electronic device 100 may set a security code to enable access to external memory 120. By way of example, but not limitation, electronic device 100 may set the security code to enable access to specific folders and/or files in the external memory 120. In some embodiments, the specific folders and/or files for which the security code is required for access thereto may be predetermined by a user of electronic device 100. That is, the operating system of electronic device 100 may recommend folders and/or files that may require a security code protection, and the user of electronic device 100 may select one or more among the recommended folders and/or files. In other embodiments, the specific folders and/or files may be determined by the operating system of electronic device 100. The folders and/or files, which may be recommended or determined by the operating system of electronic device 100, may be ones that are related to the user's personal information, for example, including folders and/or files for a certificate for electronic banking, device settings or photos.

In some embodiments, after scanning external memory 120, electronic device 100 may provide the user of electronic device 100 with an opportunity to set the security code to enable access to external memory 120 by displaying a message that requests a user input. In response to the requesting message, if the user determines to implement security code protection for external memory 120, electronic device 100 may set the security code to enable access to external memory 120, as described above.

By way of example, but not limitation, the security code to enable access to external memory 120 may be the same as the security code to enable access to electronic device 100. In such cases, the security code to enable access to external memory 120 may not need to be stored in electronic device 100 (e.g., an internal memory of electronic device 100). By way of example, the security code for both of electronic device 100 and external memory 120 may include an alphanumeric code, a user-drawn pattern or a user's gesture. If the security code to enable access to electronic device 100 is the user-drawn pattern or the user's gesture, the operating system of electronic device 100 may convert the security code into its digital version for use as the security code to enable access to external memory 120.

By way of another example, but not limitation, the security code to enable access to external memory 120 may be randomly generated by, for example, the operating system of electronic device. Further, the operating system may generate the random-generated code based on the security code to enable access to electronic device 100. Such random-generated code may need to be stored in electronic device 100 for later access to external memory 120.

By way of yet another example, but not limitation, the operating system of electronic device 100 may use device information of electronic device 100 for the security code to enable access to external memory 120. Thus, the device information of electronic device 100 may include a MAC address, a Bluetooth ID or a serial number of electronic device 100. In such cases, when the device information is changed, the security code to enable access to external memory 120 may be updated. Further, such security code to enable access to external memory 120 may not need to be stored in electronic device 100.

In some embodiments, the security code to enable access to external memory 120 may be transmitted to and stored in an account of a cloud data center which may be communicatively connected to electronic device 100. In such cases, the security code to enable access to external memory 120 may not need to be stored in electronic device 100.

In some embodiments, after setting of the security code to enable access to external memory 120, when the user of electronic device 100 accesses external memory 120 (or a specific folder or file thereof), the operating system of electronic device 100 may provide to external memory 120, on behalf of the user of electronic device 100, the security code by which access to external memory 120 may be provided. By way of example, but not limitation, the user of electronic device 100 may select external memory 120 in a navigation pane on a screen of electronic device 100 to access external memory 120. In such cases, since the user has already been authenticated with the security code to enable access to electronic device 100, it is assumed that the user is authorized to access external memory 120. Thus, electronic device 100 may not request the security code to enable access to external memory 120 to the user, and the operating system of electronic device 100 may automatically enter the security code into external memory 120.

In some embodiments, as depicted in FIG. 1B, when the user of electronic device 100 executes an external memory removal function, electronic device 100 may display, on its screen, a message 140 (e.g., REMOVE EXT. MEMORY) that requests user confirmation to remove external memory 120 from electronic device 100. As depicted, if the user selects "YES," electronic device 100 may remove a requirement for entry of the security code to enable access to external memory 120, which has been set when external memory 120 is operatively connected to electronic device 100, for example, as described above with reference to FIG. 1A. The user may then safely remove external memory 120 from electronic device 100, and access to external memory 120 may be authorized, when connected to at least one other electronic device, without requiring entry of the security code. That is, the security code that provides access to external memory 120 may also be used to facilitate a safe and authorized removal or disconnection of external memory 120 from electronic device 100; therefore, the aforementioned security code may further provide subsequent access to external memory 120 when it is operatively connected to at least one other electronic device.

An unauthorized user, who is not authorized to use electronic device 100 or access the contents of external memory 120, may want to remove or disconnect external memory 120 from electronic device 100 to gain access to the contents stored therein using another electronic device. Since the unauthorized user is not aware of the security code to enable access to electronic device 100, he/she may not be able to execute the external memory removal function described above and thus, may not be able to safely and/or properly remove external memory 120 from electronic device 100. Thus, in accordance with some embodiments, external memory 120 may maintain the requirement for entry of the security code to enable access thereto. When the unauthorized user tries to access external memory 120 using the other electronic device, external memory 120 (connected to the other electronic device) may require the security code, and the unauthorized user may not be able to access external memory 120. Thus, the contents stored in external memory 120 can be protected from such unauthorized user.

In some embodiments, when electronic device 100 does not properly operate, even an authorized user of electronic device 100 (who is aware of the security code to enable access to external memory 120) may need to disconnect external memory 120 from electronic device 100 without executing the external memory removal function. The authorized user may then connect external memory 120 to another electronic device and access it using the security code to enable access to external memory 120. Thus, if the security code to enable access to external memory 120 is an alphanumeric code (which may be the same with electronic device 100 or may be one that has been generated by the operating system of electronic device 100), the authorized user may be able to access external memory 120 using the other electronic device by typing in the security code.

In some embodiments, if the security code to enable access to external memory 120 is a user-drawn pattern or a user's gesture, external memory 120 may receive from electronic device 100 and store therein an interpretation program to interpret the pattern or the gesture at the time of setting the security code to enable access to external memory 120 or for removal of external memory 120. In such cases, when external memory 120 is disconnected from electronic device 100 and operatively connected to the other electronic device so as to gain access to the contents thereof, the interpretation program may be executed to request that a user draw the pattern or make the gesture that is used as the security code. The user may then draw the pattern using, e.g., a mouse, stylus, or finger on the other electronic device or make the gesture in front of a video camera connected to the other electronic device. The interpretation program may analyze the user's input of the pattern or gesture and allow the access to external memory 120 when the user's input corresponds to the security code to enable access to external memory 120.

In some embodiments, external memory 120 may receive from electronic device 100 and store therein a program to authenticate the security code to enable access to external memory 120 when it is accessed by the other electronic device. By way of example, but not limitation, when the security code to enable access to external memory 120 is different than the security code to enable access to electronic device 100 (i.e., for example, a random-generated code, a code generated based on device information of electronic device 100), the program to authenticate may receive the security code to enable access to electronic device 100 and provide the security code to enable access to external memory 120 to the user who tries to access external memory 120 using the other electronic device. By way of another example, but not limitation, when the security code to enable access to external memory 120 is a user-drawn pattern or a user's gesture, the program to authenticate may perform the function of the interpretation program as described above. By way of yet another example, but not limitation, when the security code to enable access to external memory 120 is stored in the account of the cloud data center which is communicatively connected to electronic device 100, the program to authenticate may download the security code from the account of the cloud data center and provide the security code to enable access to external memory 120. In some embodiments, the program may count a number of incorrect attempts to access external memory 120. When the counted number exceeds a threshold number, the program may lock or even destroy external memory 120 or at least one folder/file that has been protected by the security code, and/or, report its current location, an IP address, etc. to the owner of electronic device 100, a mobile operator, an operating system vendor, or a police.

Figure 2:
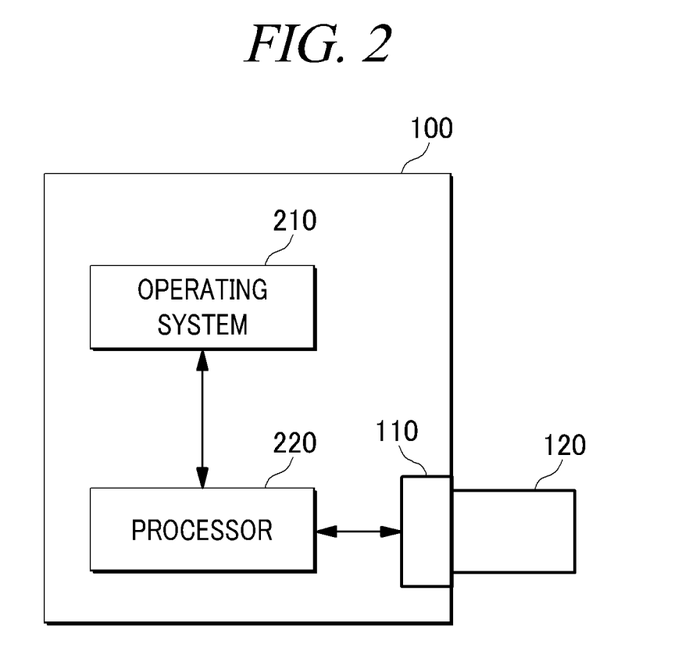
FIG. 2 shows a schematic block diagram illustrating an example architecture of an electronic device for implementing an access control scheme for an external memory, arranged in accordance with at least some embodiments described herein.

FIG. 2 shows a schematic block diagram illustrating an example architecture of electronic device 100 for implementing an access control scheme for external memory 120, arranged in accordance with at least some embodiments described herein.

As depicted, electronic device 100 may include an operating system 210, a processor 220 and connector 110 to which external memory 120 may be operatively connected. Operating system 210 may manipulate processor 220 to implement the access control scheme for external memory 120 as described herein.

Figure 3:
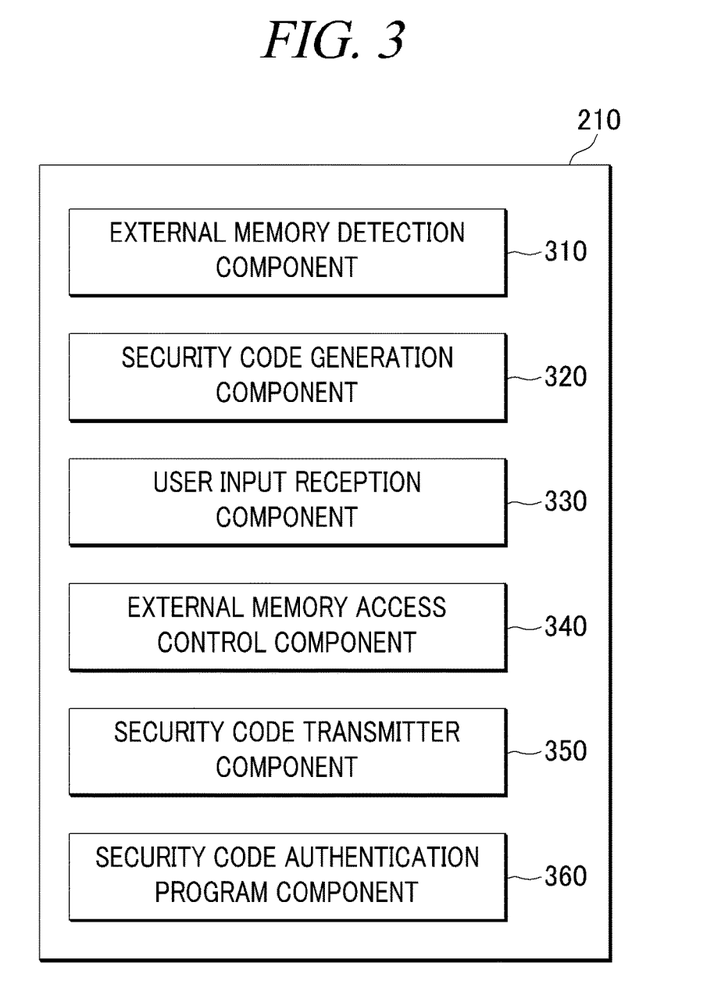
FIG. 3 shows a schematic block diagram illustrating an example architecture of an operating system for implementing an access control scheme for an external memory, arranged in accordance with at least some embodiments described herein.

FIG. 3 shows a schematic block diagram illustrating an example architecture of operating system 210 for implementing an access control scheme for external memory 120, arranged in accordance with at least some embodiments described herein.

As depicted, operating system 210 may include an external memory detection component 310, a security code generation component 320, a user input reception component 330, an external memory access control component 340, a security code transmitter component 350, and a security code authentication program component 360.

External memory detection component 310 may be configured to detect external memory 120 being operatively connected to electronic device 100 via connector 110. External memory detection component 310 may be further configured to scan the connected electronic device 100 to identify the contents stored therein.

Security code generation component 320 may be configured to generate a security code to enable access to external memory 120. Security code generation component 320 may generate the security code to enable access to external memory 120 based on a security code to enable access to electronic device 100 or device information of electronic device 100 such as a MAC address, a Bluetooth ID, or a serial number of electronic device 100. When operating system 210 decides to use, as the security code to enable access to external memory 120, the security code to enable access to electronic device 100 or the device information of electronic device 100, security code generation component 320 may not need to operate.

User input reception component 330 may be configured to receive an input from the user of electronic device 100. The user input may include, as an example but not limitation, a request to set the security code to enable access to external memory 120 or a request to remove the requirement for entry of the security code to enable access to external memory 120.

External memory access control component 340 may be configured to set the security code to enable access to external memory 120 upon the detection of external memory 120 by external memory detection component 310 or in response to the user request received by user input reception component 330. External memory access control component 340 may be further configured to remove the requirement for entry of the security code to enable access to external memory 120 in response to the user request received or detected by user input reception component 330.

Security code transmitter component 350 may be configured to transmit the security code to enable access to external memory 120 to an account of a cloud data center, which may be communicatively connected to electronic device 100. The security code may then be stored in the account of the cloud data center to authenticate an access to external memory 120.

Security code authentication program component 360 may be configured to authenticate the security code to enable access to external memory 120 when it is disconnected from electronic device 100 and an attempt to access the contents thereof is made by another electronic device. Security code authentication program component 360 may perform, at least, the operations of the program described with reference to FIG. 1A above.

Figure 4A:
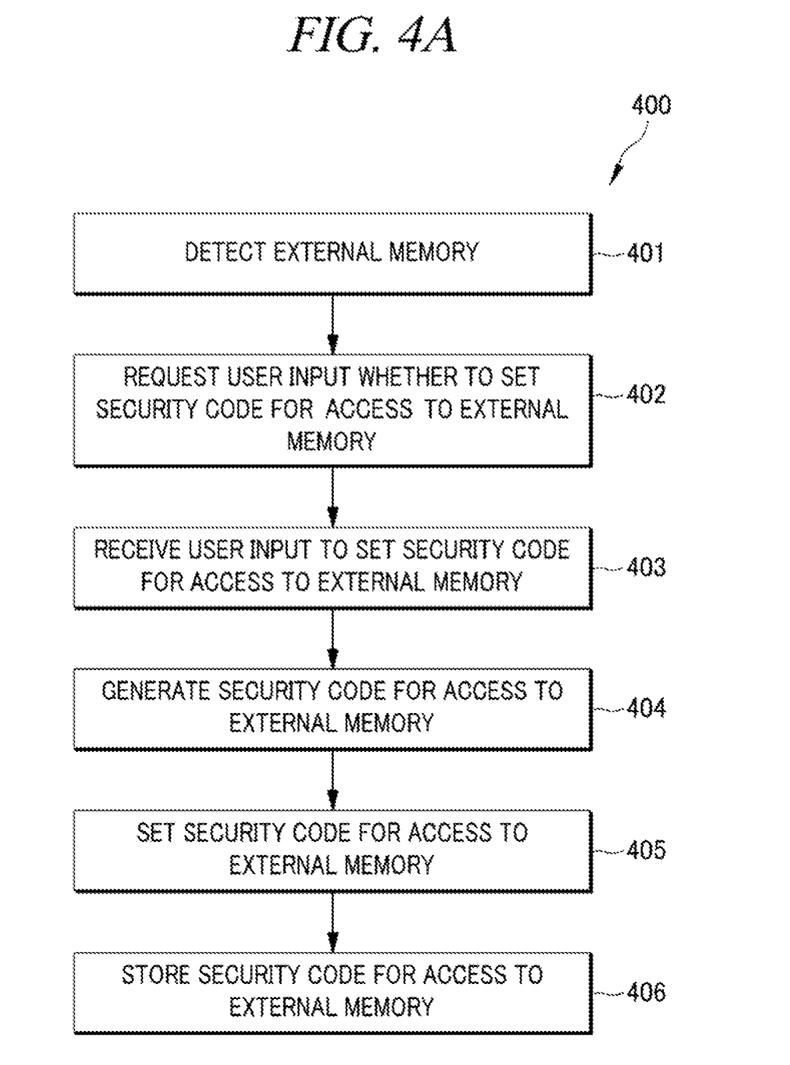
FIGS. 4A-4C show an example flow diagram of a process for an electronic device implementing an access control scheme for an external memory, arranged in accordance with at least some embodiments described herein.
Figure 4B:
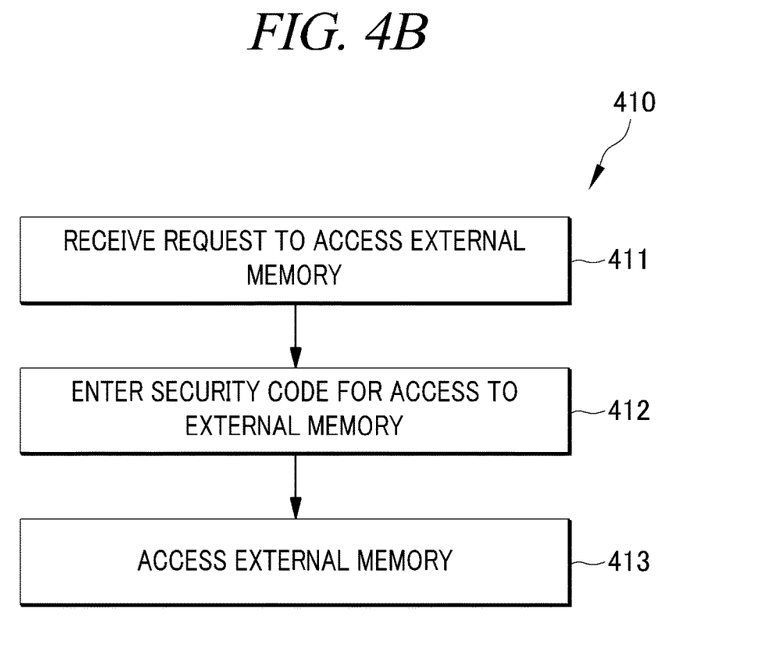
Figure 4C:
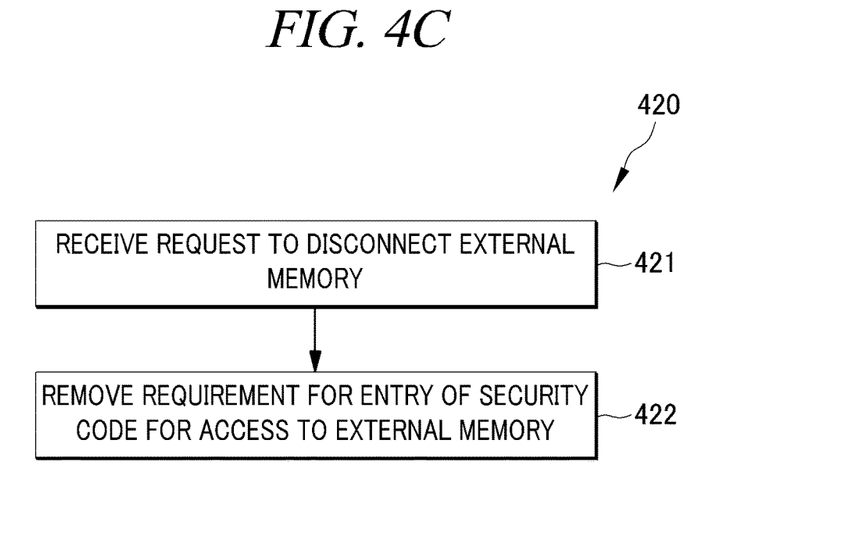

FIGS. 4A-4C show an example flow diagram of a process for an electronic device implementing an access control scheme for an external memory, arranged in accordance with at least some embodiments described herein.

Processes 400, 410 and 420 may be implemented in or by an electronic device such as electronic device 100 including operating system 210, processor 220 and connector 110 to which external memory 120 may be operatively connected. Processes 400, 410 and 420 may also be implemented by operating system 210 stored in electronic device 100.

Process 400 (as depicted in FIG. 4A) may show a process of setting a security code to enable access to external memory 120, and include one or more operations, actions, or functions as illustrated by one or more blocks 401, 402, 403, 404, 405 and/or 406. Although illustrated as discrete blocks, various blocks may be divided into additional blocks, combined into fewer blocks, or eliminated, depending on the desired implementation. Processing may begin at block 401.

At block 401 (Detect External Memory), electronic device 100 and/or operating system 210 (e.g., external memory detection component 310) may detect external memory 120 when it is operatively connected to electronic device 100 via connector 110. Processing may continue from block 401 to block 402.

At block 402 (Request User Input whether to Set Security Code for Access to External Memory), electronic device 100 and/or operating system 210 may ask the user of electronic device 100 to set the security code to enable access to external memory 120. By way of example, but not limitation, electronic device 100 and/or operating system 210 may provide, on a display screen of electronic device 100, a message that requests the user to confirm whether to set the security code to enable access to external memory 120. Processing may continue from block 402 to block 403.

At block 403 (Receive User Input to Set Security Code for Access to External Memory), electronic device 100 and/or operating system 210 (e.g., user input reception component 330) may receive the user input to set the security code to enable access to external memory 120. In some embodiments, electronic device 100 and/or operating system 210 may automatically set the security code to enable access to external memory 120 on behalf of the user. Therefore, in such cases, blocks 402 and 403 may be omitted from process 400. Processing may continue from block 403 to block 404.

At block 404 (Generate Security Code for Access to External Memory), electronic device 100 and/or operating system 210 (e.g., security code generation component 320) may generate the security code to enable access to external memory 120. By way of non-limiting example, the security code may be randomly generated or generated based on an existing security code to enable access to electronic device 100 or device information thereof. In some embodiments, the security code to enable access to external memory 120 may be the same as the security code to enable access to electronic device 100 or the device information thereof. Therefore, in such cases, block 404 may be omitted from process 400. Processing may continue from block 404 to block 405.

At block 405 (Set Security Code for Access to External Memory), electronic device 100 and/or operating system 210 (e.g., external memory access control component 340) may set the security code to enable access to external memory 120. In some embodiments, electronic device 100 and/or operating system 210 may set the security code to enable access to specific folders and/or files in the external memory 120. Processing may continue from block 405 to block 406.

At block 406 (Store Security Code for Access to External Memory), electronic device 100 and/or operating system 210 may store the security code to enable access to external memory 120 in, for example, an internal memory of electronic device 100. In some embodiments, electronic device 100 and/or operating system 210 (e.g., Security Code Transmitter Component 350) may store the security code to enable access to external memory in an account of a cloud data center, which is communicatively connected to electronic device 100. In such cases, as well as when the security code to enable access to external memory 120 is the same as the security code to enable access to electronic device 100 or the device information of electronic device 100, the security code to enable access to external memory 120 may not need to be separately stored. Therefore, in such cases, block 406 may be omitted from process 400.

Process 410 (as depicted in FIG. 4B) may show a process of accessing external memory 120, and include one or more operations, actions, or functions as illustrated by one or more blocks 411, 412 and/or 413. Although illustrated as discrete blocks, various blocks may be divided into additional blocks, combined into fewer blocks, or eliminated, depending on the desired implementation. Processing may begin at block 411.

At block 411 (Receive Request to Access External Memory), electronic device 100 and/or operating system 210 may receive, from the user of electronic device 100, a request to access external memory 120. Processing may continue from block 411 to block 412.

At block 412 (Enter Security Code for Access to External Memory), electronic device 100 and/or operating system 210 may automatically enter the security code to enable access to external memory 120. Since the security code to enable access to external memory 120 has been automatically entered, the user of electronic device 100 may not need to pay attention to the security code to enable access to external memory 120. Processing may continue from block 412 to block 413.

At block 413 (Access External Memory), electronic device 100 and/or operating system 210 may provide the user with access to external memory 120 and provide the user of electronic device 100 with contents stored therein.

Process 420 (as depicted in FIG. 4C) may show a process of disconnecting external memory 120, and include one or more operations, actions, or functions as illustrated by one or more blocks 421 and/or 422. Although illustrated as discrete blocks, various blocks may be divided into additional blocks, combined into fewer blocks, or eliminated, depending on the desired implementation. Processing may begin at block 421.

At block 421 (Receive Request to Disconnect External Memory), electronic device 100 and/or operating system 210 may receive, from the user of electronic device 100, a request to disconnect external memory 120. Processing may continue from block 421 to block 422.

At block 422 (Remove Requirement for Entry of Security Code for Access to External Memory), electronic device 100 and/or operating system 210 may remove a requirement for entry of the security code to enable access to external memory 120. External memory 120 may then be disconnected from electronic device 100 and accessed by another electronic device without requesting a security code.

As such, electronic device 100 and/or operating system 210 may set the security code to enable access to external memory 120 and automatically enter the security code, when the user of electronic device 100 attempts to access external memory 120, thereby eliminating a user interaction regarding the security code to enable access to external memory 120. Further, since electronic device 100 and/or operating system 210 may remove the requirement for entry of security code to enable access to external memory 120 upon receiving the user request (i.e., only when external memory 120 is properly removed), the contents stored in external memory 120 can be protected from an unauthorized user.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
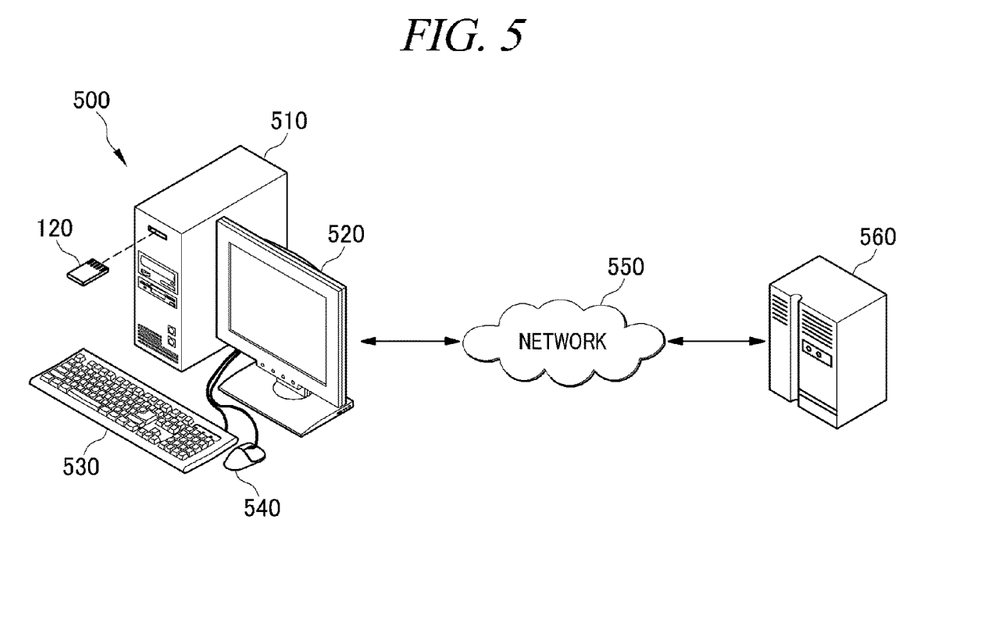
FIG. 5 shows an illustrative example of a system for authenticating a security code to enable access to an external memory, arranged in accordance with at least some embodiments described herein.

FIG. 5 shows an illustrative example of a system for authenticating a security code to enable access to external memory 120, arranged in accordance with at least some embodiments described herein.

External memory 120 may be protected by a security code set by, for example, electronic device 100 as described above with reference to FIGS. 1 to 4. Further, external memory 120 may store a program that authenticates the security code as described above.

As depicted, external memory 120 may be operatively connected to a system 500 including a user device 510, a monitor 520, a keyboard 530 and a mouse 540. Further, system 500 may be communicatively connected, via a network 550, to a server 560. Server 560 may be a cloud data center storing the security code to enable access to external memory 120 which has been transmitted, for example, from electronic device 100.

When a user attempts to access external memory 120 using system 500, system 500 may request the security code to enable access external memory 120. By way of example, if the security code is an alphanumeric code, the user may enter the security code using keyboard 530. By way of another example, if the security code is a user-drawn pattern, the program stored in external memory 120 may request the user's input of drawing the pattern using mouse 540. The program may analyze the user's input of the pattern and allow the access to external memory 120 when the user's input corresponds to the security code to enable access to external memory 120.

In some embodiments, the program stored in external memory 120 may obtain the security code from server 560. In such cases, the program may request a user account and a passcode that are related to electronic device 100 to access server 560.

Figure 6:
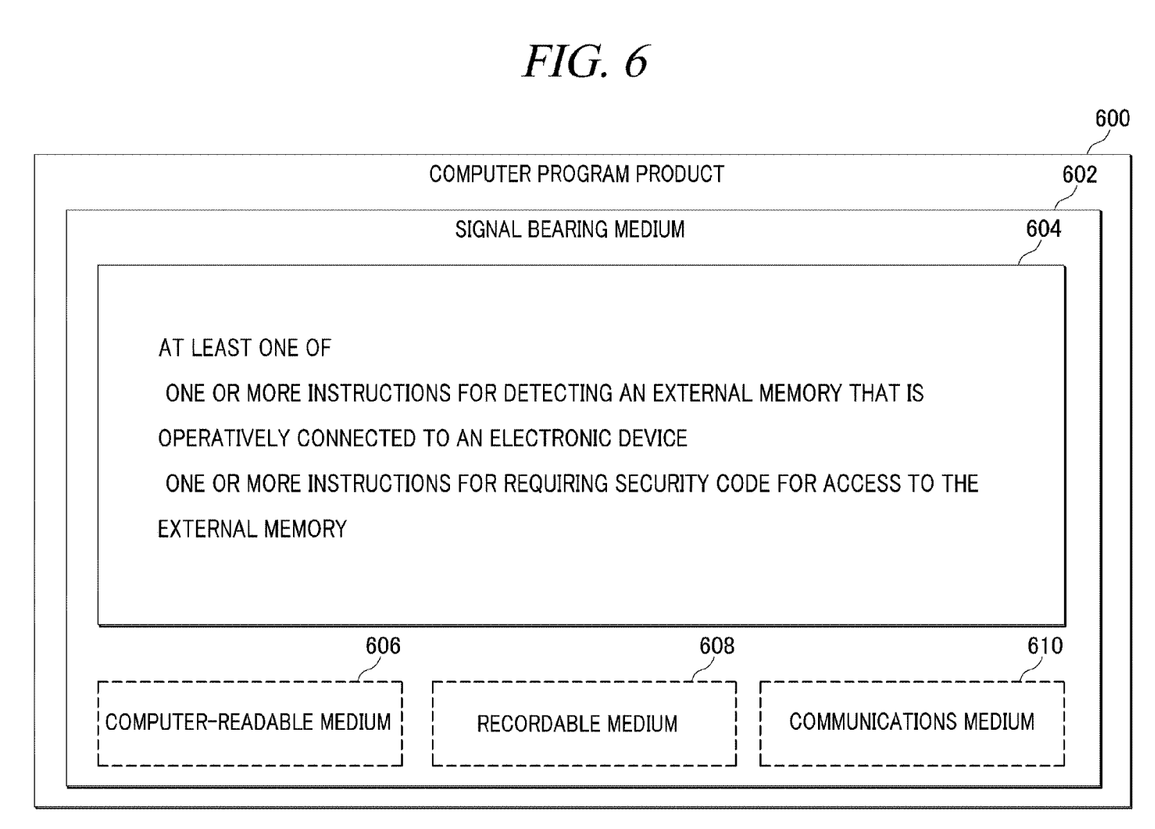
FIG. 6 illustrates an example computer program product that may be utilized to implement an access control scheme for an external memory, arranged in accordance with at least some embodiments described herein.

FIG. 6 illustrates an example computer program product 600 that may be utilized to implement an access control scheme for an external memory, arranged in accordance with at least some embodiments described herein.

Computer program product 600 may be hosted by an electronic device, such as electronic device 100. As depicted, computer program product 600 may include a signal bearing medium 602. Signal bearing medium 602 may include one or more instructions 604 that, when executed by, for example, a processor, may provide the functionality described above with respect to FIGS. 1-5. By way of example, instructions 604 may include: one or more instructions for detecting an external memory that is operatively connected to an electronic device; or one or more instructions for requiring security code to enable access to the external memory. Thus, for example, referring to FIGS. 1-5, electronic device 100 and/or operating system 210 may undertake one or more of the blocks shown in FIG. 4A in response to instructions 604.

In some implementations, signal bearing medium 602 may encompass a computer-readable medium 606, such as, but not limited to, a hard disk drive (HDD), a compact disc (CD), a digital versatile disc (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communication medium 610, such as, but not limited to, a digital and/or an analog communication medium (e.g., a fiber optic cable, a waveguide, a wired communication link, a wireless communication link, etc.). Thus, for example, computer program product 600 may be conveyed to one or more modules of application provider server and/or invitation manager by an RF signal bearing medium 602, where the signal bearing medium 602 is conveyed by a wireless communication medium 610 (e.g., a wireless communication medium conforming with the IEEE 802.11 standard).

Figure 7:
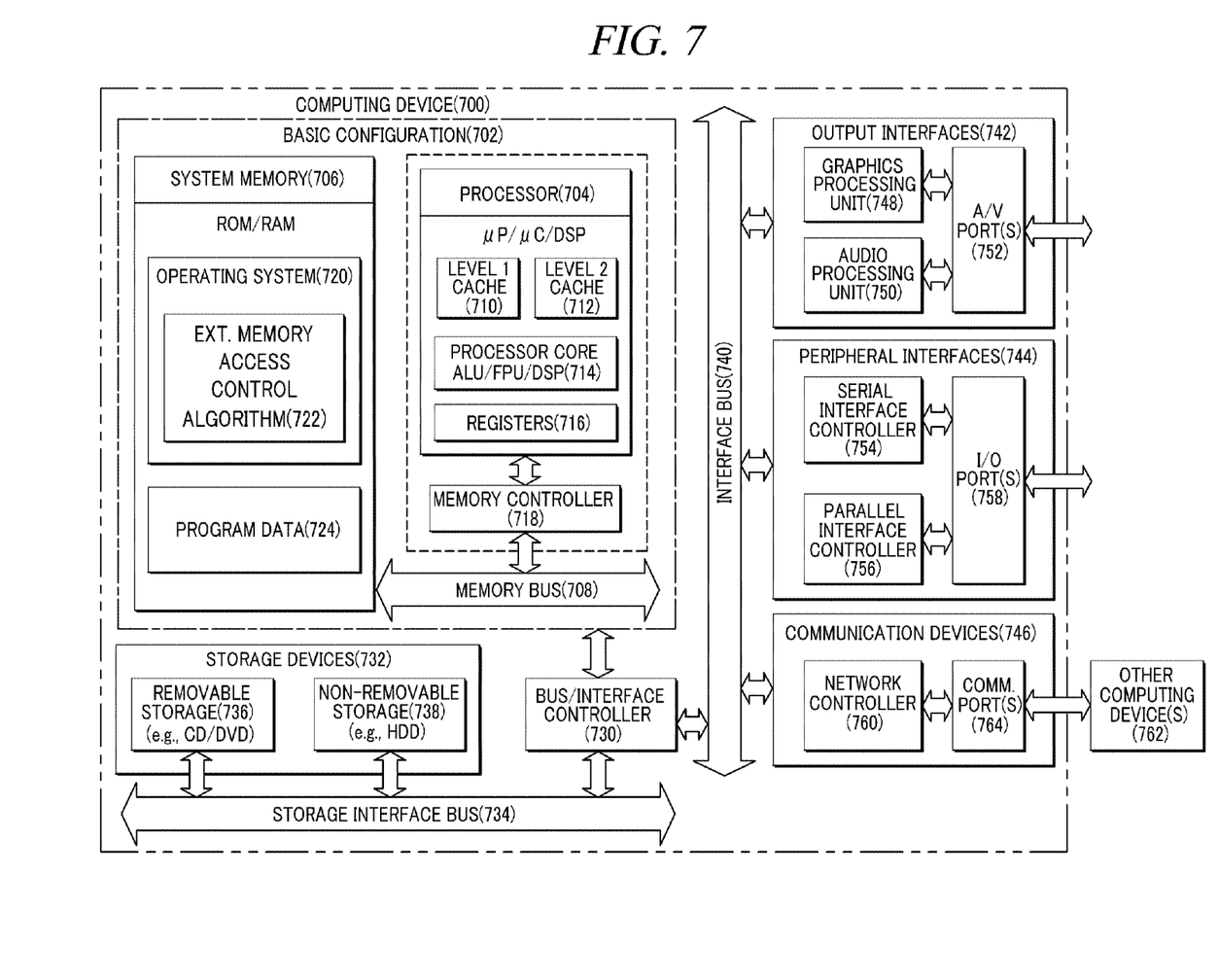
FIG. 7 is a block diagram illustrating an example computing device that may be utilized to implement an access control scheme for an external memory, arranged in accordance with at least some embodiments described herein.

FIG. 7 is a block diagram illustrating an example computing device that may be utilized to implement an access control scheme for an external memory, arranged in accordance with at least some embodiments described herein.

In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720 and program data 724.

Operating system 720 may include an external memory access control algorithm 722 that may be arranged to perform the functions as described herein including the actions described with respect to the electronic device architecture as shown in FIGS. 2-3 or including the actions described with respect to the flow charts shown in FIGS. 4A-4C. Program data 724 may include any data that may be useful for providing the access control scheme for the external memory as is described herein. In some examples, operating system 720 may be arranged to operate with program data 724 such that the access control scheme for the external memory as described herein may be provided.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of an electronic device, the method comprising:
    detecting an external memory operatively connected to the electronic device;
    setting a security code to enable access to the external memory;
    receiving a request to access the external memory;
    providing access to the external memory in response to entry of the security code;
    receiving a request, authorized by the electronic device, to disconnect the external memory from the electronic device; and
    responsive to receipt of the authorized request to disconnect the external memory from the electronic device, removing, prior to the external memory being disconnected from the electronic device, a requirement for entry of the security code to enable access to the external memory.

2. The method of claim 1, wherein the setting the security code includes setting a passcode for the electronic device, a random-generated code, or a code generated based on device information of the electronic device.

3. The method of claim 1, wherein:
the setting the security code includes setting the security code to enable access to at least one folder of the external memory, and
the removing the requirement for entry of the security code includes removing the requirement for entry of the security code to enable access to the at least one folder of the external memory.

4. The method of claim 1, further comprising:
storing the security code in an internal memory of the electronic device or a cloud data center that is related to the electronic device.

5. The method of claim 1, wherein the setting the security code protects the external memory after connection to another electronic device.

6. A method performed under control of an electronic device, the method comprising:
detecting an external memory that is operatively connected to the electronic device;
requiring a security code to enable access to the external memory;
generating the security code based at least, in part, on device information of the electronic device, wherein the device information includes a media access control (MAC) address, a Bluetooth identifier (ID), or a serial number of the electronic device;
transmitting, to the external memory, a program configured, in response to execution by another electronic device, to authenticate the security code by the other electronic device to enable access to the external memory;
receiving a request, authorized by the electronic device, to disconnect the external memory from the electronic device; and
responsive to receipt of the authorized request to disconnect the external memory from the electronic device, removing, prior to the external memory being disconnected from the electronic device, a requirement for entry of the security code to enable access to the external memory.

7. The method of claim 6, further comprising:
receiving a request to access the external memory; and
providing access to the external memory based on the security code.

8. The method of claim 6, wherein the requiring the security code includes requiring an alphanumeric code or a user-drawn pattern.

9. The method of claim 6, wherein the requiring the security code to enable access to the external memory includes requiring the security code to enable access to at least one folder of the external memory.

10. The method of claim 6, further comprising:
storing the security code in an internal memory of the electronic device or a cloud data center that is related to the electronic device.

11. The method of claim 6, wherein the program is further configured, in response to execution by the other electronic device, to:

count a number of incorrect attempts to access the external memory; and
destroy the external memory or at least one folder of the external memory, in response to the counted number having exceeded a threshold number.

12. The method of claim 6, wherein the generating the security code further includes generating the security code based at least, in part, on another security code that enables access to the electronic device.

13. An electronic device, comprising:
a processor;
an operating system; and
a connector configured to connect an external memory,
wherein the operating system, in response to execution, causes the processor to perform or control performance of operations including:
detect the external memory operatively connected to the connector;
generate a security code based at least, in part, on another security code that enables access to the electronic device;
set the security code to enable access to the external memory;
transmit, to the external memory, a program configured, in response to execution by another electronic device, to authenticate the security code by the other electronic device to enable access to the external memory;
identify a request, authorized by the electronic device, to disconnect the external memory from the electronic device; and
responsive to receipt of the authorized request to disconnect the external memory from the electronic device, remove, prior to the external memory being disconnected from the electronic device, a requirement for entry of the security code to enable access to the external memory.

14. The electronic device of claim 13, wherein the operations further include:
identify a request to access the external memory; and
provide access to the external memory in response to entry of the security code.

15. The electronic device of claim 13, further comprising an internal memory configured to store the operating system, wherein the operations further include:
store the security code in the internal memory of the electronic device or a cloud data center that is related to the electronic device.

16. The electronic device of claim 13, wherein the security code includes an alphanumeric code or a user-drawn pattern.

17. The electronic device of claim 13, wherein the security code is set to enable access to at least one folder of the external memory.

18. A non-transitory computer-readable storage medium having stored thereon computer-executable instructions that, in response to execution, cause an electronic device to perform or control performance of operations, comprising:
detect an external memory that is operatively connected to the electronic device;
require a security code to enable access to the external memory;
identify a request authorized by the electronic device to disconnect the external memory from the electronic device; and
responsive to identification of the authorized request to disconnect the external memory, enable, prior to the external memory being disconnected from the electronic device, access to the external memory without entry of the security code.

19. The non-transitory computer-readable storage medium of claim 18, wherein the operations further comprise:
store the security code in an internal memory of the electronic device or a cloud data center that is related to the electronic device.

20. The electronic device of claim 13, wherein the generation of the security code further includes generation of the security code based at least, in part, on device information of the electronic device, wherein the device information includes a media access control (MAC) address, a Bluetooth identifier (ID), or a serial number of the electronic device.

* * * * *